3,732,137
PREPARATION OF HIGH PRESSURE DECORATIVE LAMINATES HAVING REGISTERED COLOR AND EMBOSSING USING ENCAPSULATED INK
Herbert I. Scher and Israel S. Ungar, Randallstown, and John E. McQuade, Jr., Baltimore, Md., assignors to Esso Research and Engineering Company
Filed Oct. 26, 1970, Ser. No. 84,080
Int. Cl. B32b 3/00; B44c 1/24
U.S. Cl. 161—2    5 Claims

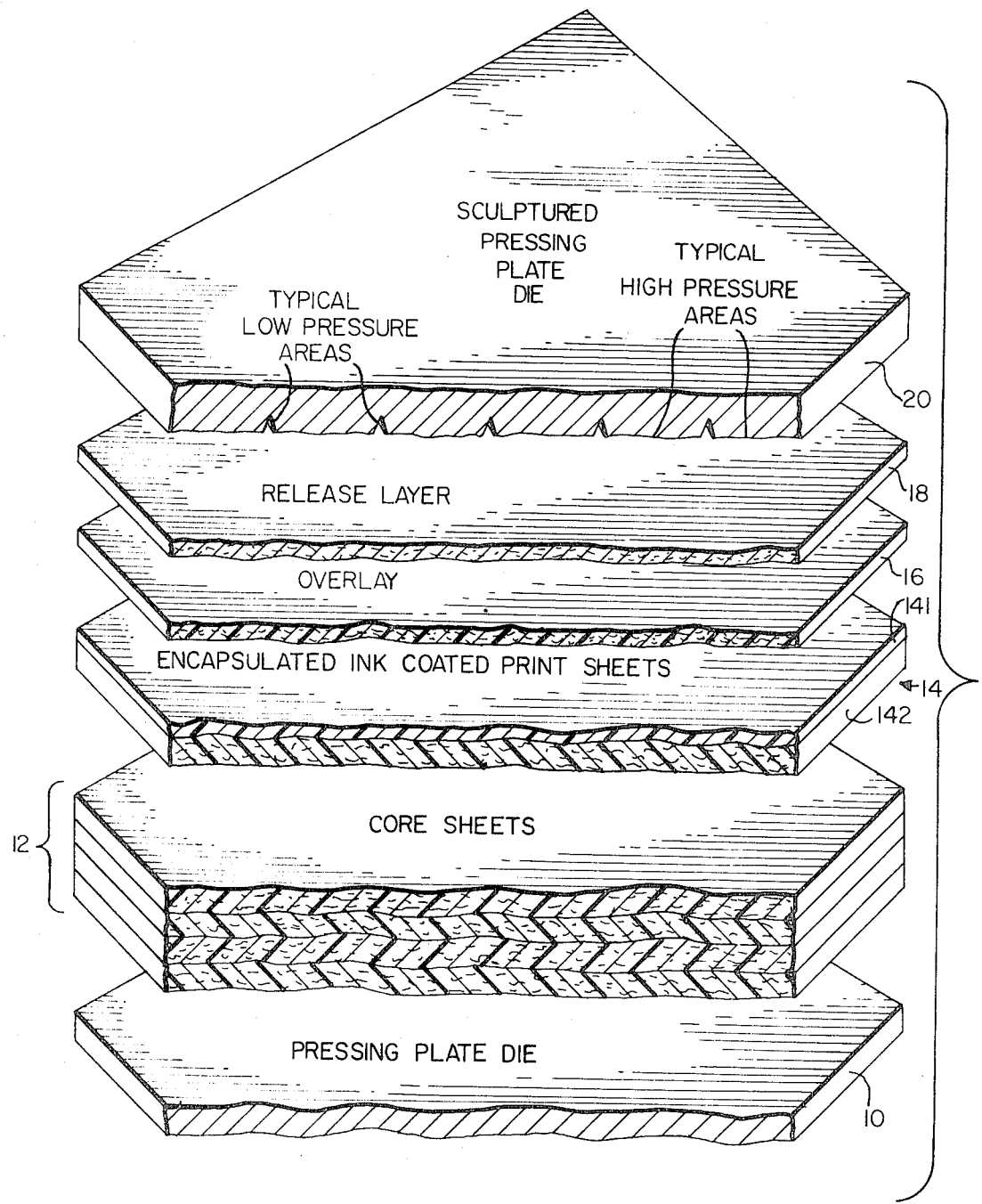

ABSTRACT OF THE DISCLOSURE

In the manufacture of high pressure decorative laminates having embossed surfaces with registration of color and texture, a melamine impregnated paper, coated with encapsulated ink, is used in place of the conventional decorative sheet below the overlay sheet. A sculptured plate is used having high pressure areas and low pressure areas, the encapsulated ing surface being separated from the sculptured plate by the overlay and a release layer. The resulting laminate after pressing has color developed by the rupture of the microcapsules and release of the ink contained therein at areas corresponding to high pressures due to the presence of and shape of the sculptured plate, whereas in the areas of lower pressure the microcapsules remain unruptured.

---

The present invention relates to high pressure decorative laminates and, more particularly, to a process for producing high pressure decorative laminates having aligned color and embossing which are in exact registry.

The production of high pressure laminates is well known, having been carried out for many years. Generally, the procedures for forming such laminates involve providing phenolic (i.e., phenol-formaldehyde) resin impregnated paper core sheets and melamine (i.e., melamine-formaldehyde) resin decorative and overlay sheets and pressing the stacked resin impregnated sheets under heat on the order of 230–310° F. and under pressure of approximately 800–1600 p.s.i. until the resins have become thermoset, thereby providing an extremely hard, attractive and permanent surfacing material known as a "high pressure laminate" meeting NEMA standards. These high pressure laminates have, for many years, found use as table tops, desk tops, counter tops, wall panelling, etc.

In the early years, generally only glossy surface laminates were produced, though some attempts were made to provide laminates with some slight surface irregularities to give satin or textured finishes. In more recent years, it has been more desirable to provide various types of irregular surfaces, ranging from relatively shallow depressions such as textured (e.g. satin, matte or semigloss) surfaces, to relatively deeply sculptured embossed surfaces which have a noticeable three-dimensional effect, such as woodgrain, leather, slate, etc. Particularly with the rising cost of such a natural product, it has become more desirable to provide a deeply sculptured high pressure laminate which simulates these natural materials.

Today, high pressure decorative laminates meeting NEMA standards are manufactured with smooth glossy surfaces, with textured surfaces, or with deeply sculptured or embossed surfaces. In the later case, a textured surface is usually superimposed on the embossed surface, and these textured surfaces are normally obtained by utilization of a release, parting or separating sheet or membrane of known type which is located, during the laminating operation, between the upper surface of the uppermost lamina and the molding die. In the production of deeply sculptured surfaces that simulate natural products such as slate, leather and wood, it is particularly desirable that the textured surfaces be superimposed over the face of the simulated product, since this provides a softer and more naturally appearing product.

A problem which has existed in the manufacture of deeply sculptured or embossed high pressure laminates, for which a number of solutions have been proposed, is the problem of registration of color, and embossing. The conventional registry technique used in other fields, such as the printing industry, have been unreliable on a consistent basis in the manufacture of high pressure laminates. Furthermore, these conventional techniques are relatively expensive, often involving complex electronic sensing equipment.

A particularly difficult problem presented by the registry of color and embossing in the manufacture of high pressure decorative laminates is the fact that the color provided may not overlay the laminate, since any conventional colors which might be provided would not be sufficiently resistant to abrasion to meet NEMA standards, and in such a situation the laminate could not properly be called a "high pressure laminate." Accordingly, it has heretofore been necessary in providing high pressure laminates wherein the embossing and color are in registry, to separately provide the printing and the embossing and to then, prior to lamination, align or register the separately produced items, and to maintain the registration during the laminating operation. Even where this operation has been successfully carried out, the cost has been high, not only because of the complexity of the procedure but also because of the relatively high percentage of imperfect laminates produced which must be discarded or sold as seconds.

Further, in many cases it is desirable for special designed effects to use two different high pressure type laminate configurations, one of which has a first design and another of which has a second design. In many cases, one such configuration would be provided with one type embossing and color, while the other configuration may have no embossing and a different color. One example of such a special effect would be the production of a desk top having a simulated blotter at the middle portion surrounded by a simulated wood periphery; in this example, the entire laminate may have a textured surface but only the "wood" periphery would be provided with a sculptured effect. In the past, such special effects have been provided by fabrication techniques wherein two separate laminates are cut and fitted together in the proper manner; or using special laminating die plates of varying surface configuration, it has been necessary to carefully interfit the two similar pattern sheets prior to laminating so that they not only can be aligned with one another, but can also be properly aligned with the special laminating die plate along the periphery of the special surface-configured area. This procedure is difficult, time-consuming, expensive and has a high proportion of imperfectly formed products.

It is, accordingly, an object of the present invention to overcome deficiencies in the prior art, such as indicated above.

It is another object of the present invention to provide a unitary high pressure decorative laminate having registered, different patterned areas, in a simple and inexpensive manner.

It is another object of the present invention to provide for decorative high pressure laminates, having registered color and embossing, in a simplified and inexpensive manner.

It is another object of the present invention to provide a new and improved method for inexpensively manufacturing high pressure laminates having registered color and embossing.

In the present exemplification of this invention, there is disclosed a process which involves using in place of the conventional decorative sheet below the overlay sheet, a melamine impregnated paper coated with encapsulated ink. A sculptured plate is used having high pressure areas and low pressure areas, the encapsulated ink surface being separated from the sculptured plate by the overlay and a release layer. The resulting laminate after curing has color developed by the rupture of the microcapsules and release of the ink contained therein in an area corresponding to high pressures due to the presence and shape of the sculptured plate, whereas in the areas of lower pressures the microcapsules remain unruptured.

To the attainment of these ends and the accomplishment of the above, as well as other new and useful objects as will appear below, the invention relates to the features of novelty in substantially the construction, combination and arrangement of the several parts hereinafter described and shown in the accompanying drawings as an example illustrating this invention, and in which:

The sole figure schematically shows the formation of a high pressure laminate in accordance with the present invention.

Referring to the figure, there is seen a lay-up for producing an embossed decorative high pressure laminate in which the embossed areas have different color than the other or debossed areas. From the bottom up there is provided the conventional bottom pressing plate 10, the conventional plurality of phenolic impregnated paper core sheets 12, the print sheet 14, the conventional melamine resin impregnated overlay sheet 16, the conventional parting or release layer 18, and the sculptured or embossed pressing plate die 20.

The print sheet 14 differs from the conventional melamine resin impregnated print sheet normally used in a high pressure laminate lay-up in that it is coated or impregnated on its surface with microencapsulated ink particles, the microencapsulated ink particle coating being schematically shown at 141 and the melamine impregnated paper backing having a print thereon being shown at 142.

The lay-up is cured using a normal pressing cycle, the resultant high pressure laminate being provided with embossed areas by pressing against the sculptured pressing plate die 20. The resulting laminate has color developed by the rupture of the microcapsules and the release of the ink contained therein at areas corresponding to high pressures due to the presence of and shape of the texturing plate. In areas of the laminate corresponding to lower pressure, corresponding to the grooves 201 in the sculptured pressing plate die 20, the microcapsules remain unruptured thereby releasing no ink and producing no contrasting color. In general, it will be understood that any combinations of print paper color, unruptured capsule color, and released color are possible with the result being a high pressure laminate having areas with contrasting color and texture in exact registration.

With regard to the nature of the sculptured pressing plate die 20, any such plate may be used. For example, one may use an expensive machined or etched steel plate, or one may use a molding plate of the type described in the Jenkins Pat. No. 2,606,855, or the Michaelson et al. Pats. Nos. 3,303,081 or 3,311,520. Also, one may use a thin, embossed, impregnated separator sheet having a non-stick facing of the type disclosed in copending application of Scher and Ungar, Ser. No. 865,894, filed Oct. 13, 1969, as the embossing surface, in which case the release layer 18 may be eliminated along with the sculptured printing plate die 20, though a flat pressing plate of the nature of pressing plate die 10 will be used to back up the thin, embossed, impregnated separator sheet.

In those instances where a release or parting layer 18 is used, such layers may be selected from those commercially available. These release layers 18 usually provide the dual function of imparting a textured finish to the laminate and also prevent adhesion of the upper surface of the laminate, i.e., the overlay layer 16, to the sculptured pressing plate die 20. Among the release sheets 18 commercially available may be mentioned aluminum foil, silicone resin treated paper, silicone oil treated paper, "Quillion" treated paper, fluoro carbon resin treated paper, sodium alginate treated paper, paper-aluminum foil laminate, etc. Any of these materials may be used as the release layer 18, so long as the non-adherent surface of the release layer 18 is facing the overlay 16.

The overlay layer 16, along with the core sheets 12 are those conventionally used in the manufacture of high pressure laminates. The overlay sheet 16 will normally comprise alpha-cellulose paper impregnated with melamine resin. The plurality of core sheets 12 will normally comprise kraft paper impregnated with phenolic resin. The pressing plate die 10, located immediately below the core sheets 12, may comprise a simple metallic plate, such as is conventionally used.

The results of the present invention depend upon the nature of the print sheet 14. This print sheet 14 comprises a melamine resin impregnated paper sheet 142, preferably having a design printed on its surface, which sheet 142 is provided with a coating 141 on its upper surface which comprises encapsulated ink. The paper 142 that would ordinarily serve as the print sheet on a normal laminate lay-up, either imprinted with a suitable design such as wood grain or colored or even unprinted paper, is impregnated with or coated with microencapsulated ink particles in accordance with known techniques; the paper is then saturated with melamine resin and incorporated into the laminate lay-up as shown in the figure. Among the patents showing known techniques for providing the microencapsulated ink particle coating may be mentioned, without limitations, the Green Pats. Nos. 2,800,457 and 2,800,458; Schossberger et al. No. 2,890,969; Ives No. 2,962,382 and Macaulay No. 3,016,308.

After assembly of the lay-up as shown in the figure, such lay-up is cured under heat and pressure using conventional conditions as set forth above and a high pressure laminate is produced having embossed and debossed portions The embossed portions of the resultant high pressure laminate having a configuration corresponding to the typical low pressure areas 201 of the sculptured pressure plate die 20 will have the color and/or design of the print sheet 142 if the coating 141 is transparent, or if the coating 141 is opaque the embossed portions will have the color of such unruptured coating 141. On the other hand, because of the higher pressures developed over the remainder of the pressing plate die 20, the debossed areas in the resultant high pressure laminate will have the color of the ink carried in the coating 141, the high pressure areas having ruptured the capsules to release such ink.

The following examples, offered for purposes of further illustration without limitation, will more fully reveal the nature of the invention.

EXAMPLE 1

An assembled stack such as shown in the figure is provided using a die plate 20 having a simulated wood producing sculptured surface, a brown dyed print layer 142, and an encapsulated ink coating 141 containing black ink. Contrary to the die plate 20 shown in the figure, in this example, the typical high pressure areas constitute fine graining lines, the majority of the die surface corresponding to low pressure areas 201. The release layer 18 is a conventional silicone-treated parchment paper, the overlay layer 16 is a conventional melamine impregnated alpha-cellulose paper, and core sheets 12 are conventional phenolic resin impregnated core sheets. The lay-up is pressed at 1000 p.s.i. at 300° F. for about 20 minutes. The resultant laminate has a matte finish produced by the silicone treated parchment, and is embossed with a wood grain effect with black wood grain impressions or debossments separating the brown "wood" sections. The resultant high pressure laminate, meeting NEMA standards, looks and feels like wood.

EXAMPLE 2

A procedure similar to that of Example 1 is carried out except in this case the sculptured pressing plate die has a central portion which is a high pressure area and the periphery is a low pressure area. The central high pressure area is in the configuration of a desk blotter. The print sheet 142 is provided with a wood grain print, and the encapsulated ink coating contains green ink. After laminating, a simulated desk top is provided as as a unitary decorative high pressure laminate having a recessed center portion which looks like a blotter, and with a simulated wood periphery.

It is to be understood that the invention is not limited to the embodiments disclosed which are illustratively offered, and that modifications may be made without departing from the invention. For example, other encapsulated ink coatings may be provided and different resin systems may be used. It will be understood that others can, by applying knowledge, readily modify the disclosed embodiments or adapt them for various applications without departing from the generic concept and, therefore, such adaptations and modifications are intended to be comprehended within the meaning and range of equivalents of the disclosed embodiments.

What is claimed is:

1. A method of forming a unitary, registered, embossed high pressure laminate comprising:
   (A) assembling in a stack from the bottom up
      (1) a plurality of fibrous core sheets impregnated with a thermosetting resin,
      (2) a thermosetting resin impregnated fibrous print sheet coated on its upper surface with encapsulated ink,
      (3) a fibrous overlay sheet impregnated with thermosetting resin which is transparent after lamination, and
      (4) a sculptured pressing plate die having a surface with high areas and low areas capable of being impressed into the uppermost of said fibrous sheets with said high and low areas adjacent said overlay sheet, and means to prevent said sculptured pressing plate die from sticking to said overlay sheet during lamination
   (B) applying to the upper and lower surfaces of said assembly approximately 800–1600 p.s.i. at a temperature on the order of 230–310° F. to produce said unitary, registered, embossed high pressure laminate by effecting a lamination of said fibrous sheets together, imparting the sculptured surface of said die to the uppermost of fibrous sheets and effecting rupture of said encapsulated ink coating on said print sheet over areas corresponding to the high areas of said sculptured die; and
   (C) stripping said sculptured die from the resultant laminated assembly so as to produce a dense high pressure laminate having areas of registered color and embossing.

2. A method in accordance with claim 1, wherein said resin impregnated fibrous core sheets comprise phenolic impregnated core sheets, wherein said print sheet comprises a melamine resin impregnated alpha-cellulose paper, and said overlay sheet comprises melamine resin impregnated alpha-cellulose paper.

3. A method in accordance with claim 1, wherein said means to prevent said sculptured pressing plate die from sticking to said overlay sheet comprises a separate release sheet.

4. A method in accordance with claim 1, wherein said pressing plate die comprises a thin, embossed, impregnated separator sheet having a non-stick facing.

5. A decorative high pressure laminate formed by the process of claim 1, comprising a plurality of resin impregnated paper sheets laminated together and having on the upper surface thereof, embossed areas and debossed areas, said embossed areas being of a different color than said debossed areas, said embossed areas having thereunder within the interior of said laminate an unruptured encapsulated ink layer.

References Cited
UNITED STATES PATENTS

| | | | |
|---|---|---|---|
| 3,551,177 | 12/1970 | Hechtman et al. | 117—11 |
| 3,373,068 | 3/1968 | Grosheim | 156—219 |
| 3,486,752 | 12/1969 | Colvin et al. | 273—102.1 |
| 3,565,753 | 2/1971 | Yurkowitz | 162—127 |
| 3,016,308 | 1/1962 | Macaulay | 117—157 X |
| 3,674,619 | 7/1972 | Scher | 161—119 |

GEORGE F. LESMES, Primary Examiner

L. T. KENDELL, Assistant Examiner

U.S. Cl. X.R.

156—219, 221, 222, 247, 289, 323; 161—5, 6, 116, 124, 162, 168, 413, DIG. 3